June 11, 1963 C. H. A. GAMAIN 3,093,319
APPARATUS FOR PRODUCING ARTIFICIAL DAYLIGHT
Filed Oct. 21, 1960 3 Sheets-Sheet 1

INVENTOR.
Charles Henri Alfred Gamain
BY
Hovey, Schmidt, Johnson & Hovey
ATTORNEYS.

June 11, 1963 C. H. A. GAMAIN 3,093,319
APPARATUS FOR PRODUCING ARTIFICIAL DAYLIGHT
Filed Oct. 21, 1960 3 Sheets-Sheet 2

INVENTOR.
Charles Henri Alfred Gamain
BY
Hovey Schmidt Johnson & Hovey
ATTORNEYS.

June 11, 1963  C. H. A. GAMAIN  3,093,319
APPARATUS FOR PRODUCING ARTIFICIAL DAYLIGHT
Filed Oct. 21, 1960  3 Sheets-Sheet 3

INVENTOR.
Charles Henri Alfred Gamain
BY
Hovey, Schmidt, Johnson & Hovey
ATTORNEYS.

United States Patent Office 3,093,319
Patented June 11, 1963

3,093,319
APPARATUS FOR PRODUCING ARTIFICIAL DAYLIGHT
Charles Henri Alfred Gamain, 31 Rue des Annelets, Paris, France
Filed Oct. 21, 1960, Ser. No. 64,075
Claims priority, application France Nov. 26, 1959
1 Claim. (Cl. 240—1.1)

This invention relates to improvements in illuminating devices and more particularly to a method and apparatus for producing light having characteristics equivalent to those of natural or some other special illumination through the use of artificial sources of light.

The present invention is intended to give technicians, testing laboratories, artists, and similar individuals positive and easy means of realizing, from artificial sources of light, illumination equivalent to that of some special kind of light, such as natural light, which illumination will have all of the physical and photochemical properties of the special light and will produce the same effect, on colored or neutral bodies, as such special light.

It is a well known fact that the color of objects depends upon the composition of incident light and that, according to the latter, they take on very different aspects of color. Thus, is order to appreciate true colors, it is necessary and desirable to view the color in true daylight but such is frequently difficult inasmuch as daylight or natural illumination varies according to sky conditions, the hour of the day, the position of the sun and other influencing factors.

In the use of artificial light it is generally not possible to obtain the desired lighting having the characteristics of natural light from a single source but rather it is necessary, in most instances, to use a plurality of sources and to correct the source or sources of artificial light. Many devices have been suggested to achieve this desired correction such as color filters, fluorescent or luminescent emission, spark discharge in rare gases or similar means, some of which come close to producing a natural light. However the above mentioned corrective means produce natural light only for a given intensity and do not preserve this illumination for the whole range of intensities. Therefore the attempted alteration of artificial light by the above means is not satisfactory and the result tends to cause errors in the use of such modified artificial light.

It is therefore an object of the present invention to reproduce, from artificial lights, an illumination having characteristics similar to those of natural light, which illumination can be definitely produced and controlled and which can be maintained with a high degree of accuracy.

Another aim of the present invention is to provide a method artificially producing light having predetermined desired characteristics equivalent, for example, to those of natural light through the use of a plurality of artificially generated separate light emissions, which emissions are suitably controlled to provide individually differing emissions, which are combined to synthesize light having the characteristics of the desired light.

A further aim of the present invention is to provide apparatus for artificially producing light having characteristics equivalent to those, for example, of natural light, which apparatus includes an enclosure having a light generating chamber and a subject receiving chamber, there being electrically operable light sources within the light generating chamber and selectively controllable electrical circuit means coupled with each of said sources for energizing the latter and operating different pluralities of the artificial light sources whereby to produce light having the desired characteristics.

Thus the present invention involves creating the desired lighting by means of synthesizing definite radiations which are known to be found in artificial light sources such as fluorescent, luminescent and incandescent lights and invisible radiations as in the case of black light. Each of such sources is utilized in terms of its spectrum of emission and controlled either by the intensity of current passing therethrough or by selective screens.

With the present invention it is possible to obtain either a wide and progressive range of lighting or to provide a certain number of preselected combinations from the light sources.

A still further object of the present invention is to provide, in a single apparatus, means for obtaining instantaneously a wide range of lighting effects, which effects may be achieved by simply pressing one or more selected buttons to automatically obtain the type of preselected illumination most proper for a given purpose, for each button or switch corresponds to a precise, predetermined quality of light.

Other objects of the present invention will become apparent from the following specification and accompanying drawings wherein.

It is known that white light is made up of the superposition of radiations of various wave lengths, which radiations can be present in varying ratios, so that the white light is very variable, verging on one color or another.

The spectrum of daylight varies considerably according to atmospheric conditions, sun location, time of day and other uncontrollable factors. In practice, these variations are determined according to an established scale which makes reference to the temperature of the emission of the "black" body. This scale graduated in Kelvin degrees bearing the symbol "K." marks a fictitious temperature which corresponds to a predetermined emission, which, for daylight, ranges from 3500 K. to 26,000 K. Such temperatures are measured by a control apparatus called a Kelvinometer.

Each of the "temperatures" defined by the scale corresponds to a particular composition of the light spectrum. Thus, a temperature of 3500 K. corresponds to a spectrum rich in red-yellow and having very little blue. On the other hand, a temperature of 26,000 K. corresponds to a spectrum rich in violet-blue and having only a shade of orange-red. In between these mentioned extremes are to be found various temperatures corresponding to definite standards of radiations of different wave lengths as will hereinafter be pointed out.

Figure 1:
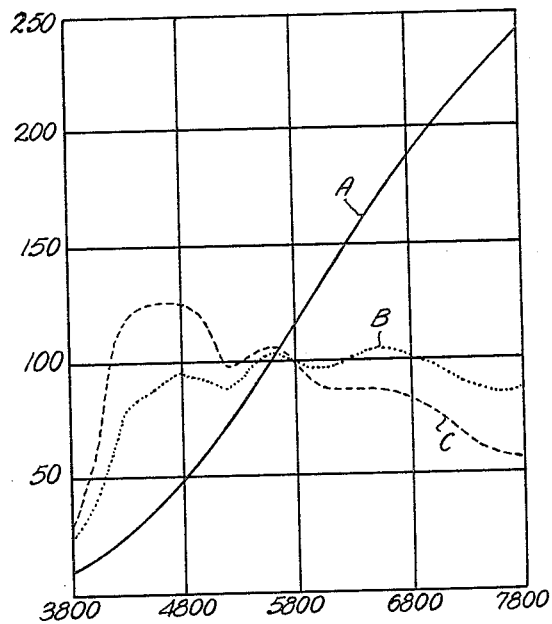
FIG. 1 is a diagram representing the spectrum of emission of various standard lights.

Certain scale values have been the subject of definitions which are used as international standards as shown in FIG. 1 of the drawing. In FIG. 1, the value of radiations in terms of wave lengths is shown in angstroms, such standards being represented by curves A, B and C. Curve A is the curve of the incandescent emission from a tungsten filament lamp with a value of 2848 K. The international standard represented by curve B is the radiation produced by the same type of lamp at 3500 K. with a corrective filter suppressing the superfluous part of redorange-yellow. As a result of the use of such a filter a practically uniform distribution of radiation in the gamut of wave lengths of the spectrum is achieved and that distribution is almost identical to that of daylight in its most yellow condition, as is the case with a smoke-filled sky or at sunset.

Standard C, as shown in FIG. 1, may be called "international" daylight and has a reference mark or value of 6500 K. The emission represented by curve C has a distribution fairly even in the spectrum and corresponds to the light in a medium cloudy sky partially overcast. It has the advantage of presenting an illumination with radiations of all wave lengths fairly equal in intensity, and, therefore, likely to project, on a lighted object, any color, simple or complex.

Figure 2:
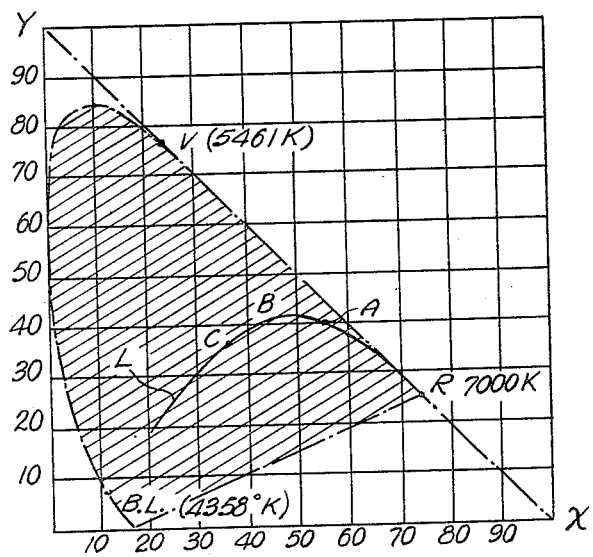
FIG. 2 is a triangular diagram illustrating the composition of colors.

The standard measurements of light B and C, as any light, white or colored, can be represented on the triangle of colors as defined by the International Convention of Lighting in 1931 and as shown in FIG. 2 of the drawing. In terms of the values of suitable coordinates X, Y and Z, one can define any color whatsoever by a point on the diagram illustrated in FIG. 2.

In the diagram illustrated in FIG. 2, red at 7000 angstroms is represented by point R, the blue at 4358 angstroms by the point BL, and green at 5461 angstroms by point V. The whole aggregate of visible colors is contained within the lined area defined by the mixed beam passing through the three points R, V and BL, which points represent the fundamental colors. The curve L appearing on the diagram of FIG. 2, represents white light and the points A, B and C shown thereon correspond to the different standards whose spectrum is represented by the corresponding curves shown in FIG. 1.

The present invention recognizes, as indicated by the data above discussed and illustrated in the drawing, that lights such as those represented by A, B and C, and others, may be utilized in a practical manner. Thus, luminous sources may be combined as hereinafter indicated, in order to fulfill certain particular lighting needs and to create combinations of luminous sources which may be used in various areas where color is a critical factor, as in the manufacture of paints and dyes or in stores where color selection is important. It is also possible to construct apparatus which will automatically control outside light coming into a given area so that there will not be too sharp a contrast between the light from the outside and the illumination provided by such apparatus. Such apparatus may take the form of a ceiling fixture such as shown in FIG. 3 of the drawing, and in such case, the same may be wired as shown in FIG. 4 of the drawing to be controlled by a remote control panel as illustrated, there being a connector 23 coupling the lighting fixture with the control panel, as is apparent from FIG. 4 of the drawing.

Figure 3:
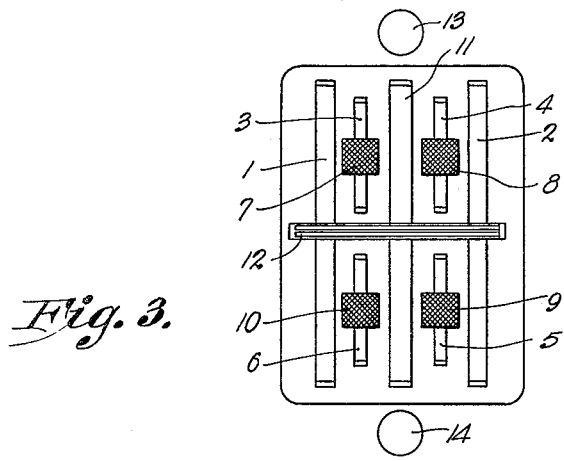
FIG. 3 is a diagram of the layout of various light sources in a preferred embodiment of the apparatus contemplated by the invention.
Figure 4:
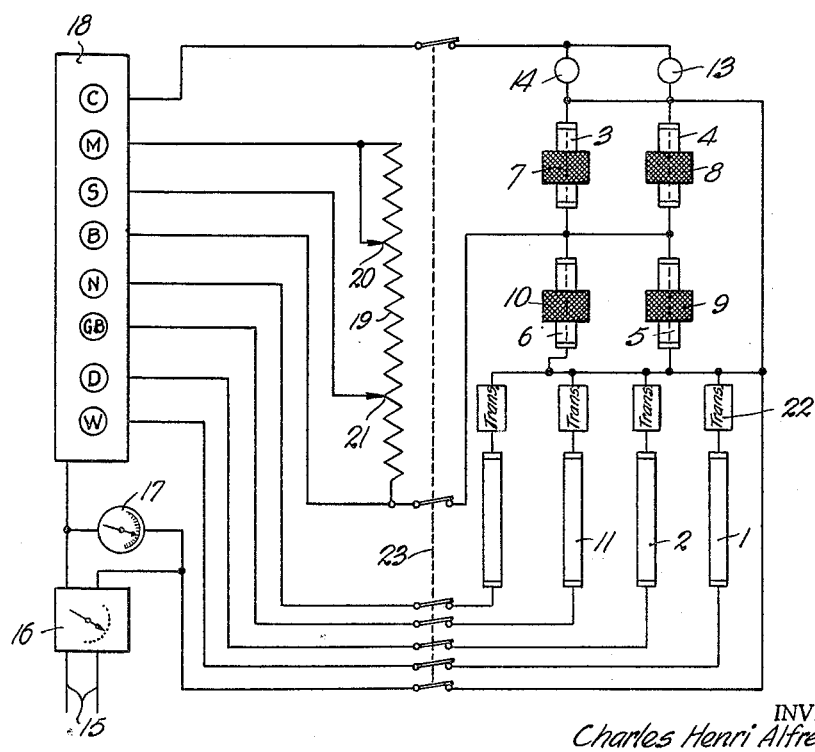
FIG. 4 is a schematic wiring diagram of the different sources of said preferred embodiment.

As shown in FIG. 3 of the drawing, the apparatus may be created by grouping several luminous sources such as luminescent tubes 1 and 2, incandescent tubes 3, 4, 5 and 6, fluorescent tube 11, a tube 12 which emits ultraviolet rays called "black light," and lamps 13 and 14 with tungsten filaments in a gaseous atmosphere.

Luminescent tubes 1 and 2 can be provided with a fluorescent dusting which modifies their radiation spectrum and incandescent lamps 3–6, which are preferably provided with tantalum filaments, which assure the strongest possible emission of red, may be used with filters such as 7, 8, 9 and 10 in order to eliminate those radiations already existing in other lighting sources present in the apparatus.

To illustrate the manner of synthesis, one may select lamps 1 and 2 whose radiation is close to that of solar light (in the neighborhood of 4500 K.). These, however, have a deficiency in blue and red and an excessive amount of green and yellow, which is corrected by means of the other lighting elements in the apparatus with radiation having a strong proportion of blue-violet.

FIG. 4 shows schematically the manner in which the different luminous sources illustrated in FIG. 3 are interconnected in order that various combinations of light may be created, each particular combination being predetermined and selectable by means of push-buttons 18.

Current for the apparatus flows from energy source 15 through variable transformer 16, which is a desirable accessory to the present apparatus inasmuch as the spectrum of emission is modified and controlled by the fluctuation of voltage. The voltage present in the apparatus is measured by voltmeter 17 and current flows therefrom to the push-buttons 18 and to luminescent lamps 1, 2, 11 and 12 and incandescent lamps 3, 4, 5 and 6 as well as lamps 13 and 14. Along the circuit of incandescent lamps 3–6, is placed a rheostat 19 with adjustable taps 20 and 21. Transformers such as 22, which are equipped with adjustable elements, operate the luminescent sources 1, 2, 11 and 12.

Utilizing the present invention, it is possible to effect any combination of lights in color and intensity. A push-button switch, such as those designated 18, is provided for controlling each of the circuits which controls the various combinations of illumination. Thus, a mere touch of an appropriate button will allow the operator of the apparatus to immediately obtain the desired illumination. In practice, the number of combinations is virtually limitless, but in each specific apparatus the number of combinations of colors obtainable would be limited in view of the specific purpose for which the particular apparatus was intended. What has been discussed herein as a preferred example refers to the most commonly desired lighting combinations and specifically to the obtaining of illumination defined by the standards A, B and C hereinabove referred to.

For example, if it is desired to obtain from the present invention illumination corresponding to daylight and to the international standard C of 6500 K., switch and push-button C is actuated, which simultaneously illuminates light sources 1, 2 and 11 and 12, sources 3–6 and lamps 13 and 14, the intensity of the latter lamp being controlled by tap 20 of rheostat 19.

Button M illuminates only lamps 3, 4, 13 and 14 and gives an effect of incandescent lighting, such as that shown by curve A in FIG. 1. This particular illumination may be utilized to make apparent the deviation between two tints of color when the latter have been made identical by different formulae under balanced spectrum lighting and when they are observed under a different spectrum light which brings out the difference of colors. In this particular regard it will be noticed that switches C and M have been placed side by side in order to permit rapid transition from daylight at 6500 K. to incandescent light at 2848 K.

By utilizing switch S the luminescent and incandescent lamps are turned on, the latter by means of tap 21 of the rheostat 19, and a light identical to that of the sun at noon, and corresponding to 5250 K., is obtained.

With switch B a light in conformity to that of the international standard B (FIGS. 1 and 2) is obtained for that switch illuminates incandescent lamps 3–6 and lamps 1 and 2 but does not illuminate lamp 11.

Switch N serves to actuate lighting sources 1, 2, 11 and 12 which give a light similar to that of a blue sky and with a value of 8320 K.

By operating switch GB a light of the common standard in Great Britain, corresponding to daylight at 9000 K., is obtained. This illumination is produced by turning on lamps 1, 11 and 12 and leaving out lamp 2 and the incandescent lamps.

With button D only lamp 11 is on and this gives a pure blue sky with a northern exposure corresponding to 26,000 K.

Button W actuates black light lamp 12 which may be used for the examination of fluorescence.

As is apparent from the foregoing, through the utilization of switches 18, individually described above, eight different lightings can be obtained each of which is predetermined and definite and corresponds to known standards.

Figure 5:
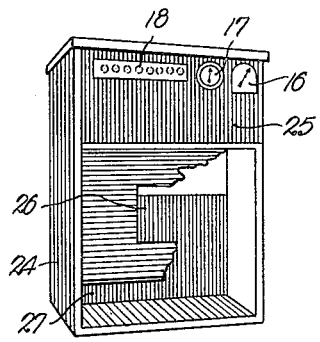
FIG. 5 is a perspective view of the preferred apparatus.
Figure 6:
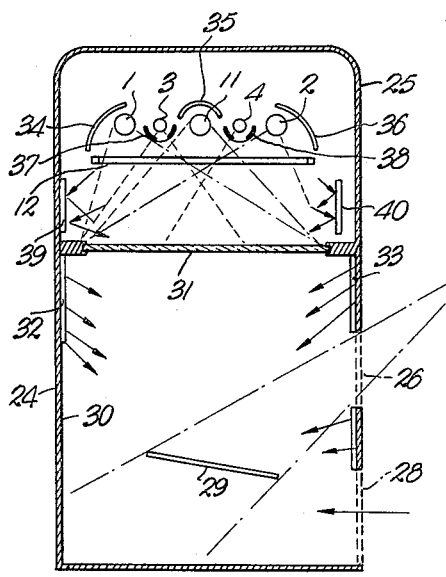
FIG. 6 is a vertical, substantially central, lateral cross section of said apparatus.

As illustrated in FIGS. 5 and 6 of the drawing, the apparatus forming the subject matter of this invention may be confined within a suitable portable cabinet 24, which cabinet 24 has a light generating chamber portion 25 containing the luminous sources as herein described and a subject receiving chamber portion 28 in which an object to be examined such as 29 may be placed for observation. Said object 29 may be viewed by the eye 27 of the user of the apparatus through opening 26. The normally rear portion 30 of subject receiving chamber 28 is blackened so that the object to be examined, 29, may be lighted upon a neutral background. Disposed between light generating chamber 25 and subject receiving chamber 28 is a diffusing opaline glass panel 31 whose coefficient of selectivity is appropriately selected so as not to alter the lighting furnished by the sources of artificial illumination. Panels 32 and 33 disposed within subject viewing chamber 28 below glass panel 31 act as reflectors in order to increase the diffusing effect, all as is apparent from FIG. 6 of the drawing.

Light generating chamber 25 has disposed therewithin the various lamps previously mentioned, that is, luminescent lamps 1, 2 and 11, incandescent lamps such as 3 and 4, the lamps 1, 2 and 11 being provided with reflectors 34, 35 and 36 as shown in FIG. 6 of the drawing. Lamps 3 and 4 are provided with slitted covers such as 37 and 38 in order to keep the pencil of light sharp and to serve as support for filter screens such as 7 and 8. Side reflectors 39 and 40 disposed within light generating chamber 25 serve to complete the diffusion in order to blend the colors.

As is apparent the FIG. 5 push button switches 18 are within easy reach of the operator of such portable apparatus as shown in said figure and the voltmeter 17 and transformer 16 are likewise easily accessible. The above described portable apparatus, which is sturdy and easily handled, is designed to make maximum utilization of the present invention and to meet the need of controlling and studying various colors under specific lighting conditions. Thus such apparatus may be used in factories, stores and the like or in any other case where it is important to ascertain colors and compare shades thereof.

Figure 7:
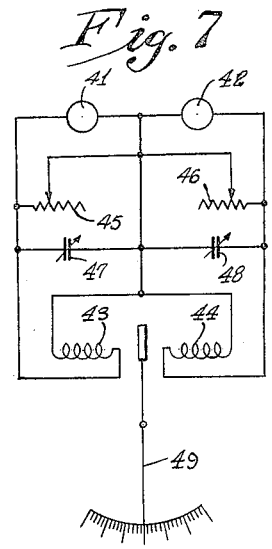
FIG. 7 is a schematic diagram of a photocolorimeter which may be used in conjunction with the other facets of the present invention.

A photocolorimeter such as shown in FIG. 7 may be utilized in conjunction with apparatus as has been herein described. In its simplest form, such a photocolorimeter is made up of two photoelectric cells 41 and 42 having selective screens, the screen of shield 41, for example, letting through a band of yellow-red of 5,630 to 7,000 angstroms and the screen of cell 42, for example, letting through a band of green-violet of 4,000 to 5,600 angstroms.

Cells 41 and 42 are connected to coils 43 and 44 of a galvanometer with resistances 45 and 46 and adjustable capacitors 47 and 48 coupled therewith. Hand 49 of the galvanometer, when properly regulated, indicates, on a dial 50, the equilibrium of the subject apparatus for a selected light and signals the need for an adjustment and re-standardization.

Having thus described the invention, what is claimed as new and desired to be secured by Letters Patent is:

Apparatus for artificially producing light having predetermined, desired characteristics equivalent to those of a special type of light such as natural light and for viewing a subject to which said artificially produced light is applied, which apparatus includes: an enclosure having a light generating chamber portion, and a subject receiving chamber portion, there being means permitting placement of a subject to be viewed within said latter chamber portion and means permitting viewing of a subject within said latter chamber portion; light diffusing means within said enclosure between said chamber portions thereof; a plurality of electrically operable light sources within said light generating chamber portion, said sources including an incandescent, tungsten filament lamp, an incandescent, tantalum filament lamp, an ultraviolet lamp and luminescent lamps; reflector means adjacent the rear and one side of each of said luminescent lamps; slitted covers mounted in front of certain of said incandescent lamp; electrical circuit means coupled with each of said sources for energizing the latter; variable resistance means coupled in said circuit means for controlling the energization of at least certain of said sources; and switch means coupled in said circuit means for selectively operating different pluralities of said sources.

References Cited in the file of this patent
UNITED STATES PATENTS

| | | |
|---|---|---|
| 1,008,588 | Coolidge | Nov. 14, 1911 |
| 1,956,630 | Shaw | May 1, 1934 |
| 1,957,404 | Beck | May 1, 1934 |
| 2,451,580 | Schwinger | Oct. 19, 1948 |
| 2,725,461 | Armour | Nov. 29, 1955 |

FOREIGN PATENTS

| | | |
|---|---|---|
| 798,884 | Great Britain | July 30, 1958 |